United States Patent
Martin

(10) Patent No.: US 8,867,048 B2
(45) Date of Patent: Oct. 21, 2014

(54) DELAYED REVIEW OF SCANNED DOCUMENTS USING UNIQUE IDENTIFICATION MARKING ON SCANNED DOCUMENTS

(75) Inventor: Nathaniel G. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 568 days.

(21) Appl. No.: 13/094,904

(22) Filed: Apr. 27, 2011

(65) Prior Publication Data

US 2012/0274963 A1 Nov. 1, 2012

(51) Int. Cl.
*H04N 1/32* (2006.01)

(52) U.S. Cl.
CPC .... *H04N 1/32133* (2013.01); *H04N 2201/3271* (2013.01); *H04N 2201/3277* (2013.01); *H04N 2201/3226* (2013.01); *H04N 2201/3269* (2013.01)
USPC .......................................... 358/1.12; 358/498

(58) Field of Classification Search
USPC .............. 358/1.15, 1.12, 1.18, 498, 474, 401, 358/1.14
See application file for complete search history.

(56) References Cited

U.S. PATENT DOCUMENTS

| | | | |
|---|---|---|---|
| 5,157,243 A * | 10/1992 | Ramsey | ......................... 235/376 |
| 5,659,164 A | 8/1997 | Schmid et al. | |
| 6,032,004 A | 2/2000 | Mirabella, Jr. et al. | |
| 6,115,578 A | 9/2000 | Mandel et al. | |
| 6,178,718 B1 | 1/2001 | Focke et al. | |
| 6,426,806 B2 | 7/2002 | Melen | |
| 6,644,764 B2 | 11/2003 | Stephens, Jr. | |
| 6,667,816 B1 | 12/2003 | Van Buren et al. | |
| 6,731,411 B1 | 5/2004 | Walforst | |
| 7,859,708 B2 | 12/2010 | Austin | |
| 2003/0223638 A1* | 12/2003 | Jackson et al. | ................. 382/179 |
| 2004/0245343 A1 | 12/2004 | Depta | |
| 2005/0198558 A1 | 9/2005 | Chrisop et al. | |
| 2006/0224895 A1 | 10/2006 | Mayer | |
| 2006/0262340 A1 | 11/2006 | Lee | |
| 2007/0237128 A1* | 10/2007 | Patel et al. | ..................... 370/351 |
| 2008/0027949 A1 | 1/2008 | Kawada | |

(Continued)

FOREIGN PATENT DOCUMENTS

| | | |
|---|---|---|
| CA | 2426536 | 10/2004 |
| NL | 1015611 | 1/2002 |

*Primary Examiner* — Jerome Grant, II
(74) *Attorney, Agent, or Firm* — Gibb & Riley, LLC

(57) ABSTRACT

A method and system include a computerized device operatively connected to a multi-function printing device. The multi-function printing device has a scanner, a media path, a printer, etc. The scanner scans a plurality of sheets of media to produce scanned images. The computerized device automatically stores the scanned images, and the media path automatically feeds the sheets of media from the scanner to the printer after the scanner scans the sheets of media. The printer automatically prints unique identification markings on the sheets of media after the scanner scans the sheets of media, such that each of the sheets of media has a different identification marking printed thereon by the printer. The computerized device automatically adds data representing each unique identification marking to each corresponding scanned image stored within the computerized device. When error images (e.g., ones of the sheets of media that were not scanned properly by the scanner) are identified, the computerized device automatically outputs the data representing each the unique identification marking for each of the error images, allowing a user to locate the sheet of media associated with the error image, to permit the improperly scanned sheets to be rescanned.

20 Claims, 2 Drawing Sheets

(56) References Cited

U.S. PATENT DOCUMENTS

| | | |
|---|---|---|
| 2008/0046417 A1 | 2/2008 | Jeffery et al. |
| 2008/0074702 A1 | 3/2008 | Miyoshi |
| 2008/0144102 A1 | 6/2008 | Curry |
| 2009/0319927 A1 | 12/2009 | Beeman et al. |
| 2011/0007343 A1 | 1/2011 | Hopper et al. |

* cited by examiner

DELAYED REVIEW OF SCANNED DOCUMENTS USING UNIQUE IDENTIFICATION MARKING ON SCANNED DOCUMENTS

BACKGROUND

Embodiments herein generally relate to scanning systems and methods and more specifically to such where a printer automatically prints unique identification markings on the sheets of media after the scanner scans the sheets of media.

A fundamental issue with hallway scanners is review of the scanned documents. Hallway scanners are useful because paper documents can be converted to image documents near to where the document is received. Most commonly, these devices are packaged as part of a multi-function printer (MFP). Such systems allow one to scan a document using a nearby "hallway" scanner. However, reviewing these documents can be difficult. Two approaches have been provided for review. One is to print the scanned image for review, but this uses large amounts of paper (that is often discarded immediately after the review). A second approach is to display the scanned image on the local user interface; however, on many devices the user interface is small making review difficult. In both cases, the person who has received the document is responsible for reviewing the scan.

Another common scanning technique is to use a scanner directly connected to a computer. In this mode, paper documents are taken to an office (with such a computer and a directly connected scanner) and converted to image documents. When using this technique, the images can easily be reviewed on the nearby computer screen as they are scanned. However, this technique requires that all of the paper documents be scanned at one location. Collecting and delivering the paper documents to one location can be inconvenient.

In one example, a doctor may receive a document from a patient that must be entered into an Electronic Medical Record (EMR). In one situation, the doctor places the paper where it can be routed to the department where it will be scanned. The people in the department scan the document, review the image, and store the document in the appropriate patient's medical record. The problem with this approach is that the paper may be lost or the association with the patient may be lost. Alternatively, the doctor can scan the document on a hallway MFD and the image can be routed to the patient's record. The problem with this approach is the doctor is responsible for making sure that the scan is legible when the paper is scanned. To perform the review, the doctor must either use the local user interface on the MFD, which may be small, or print the image, which wastes paper. Also, since doctors are often rushed, the time to review the document may not be available.

SUMMARY

An exemplary system herein includes a computerized device operatively connected to (directly or indirectly connected to) a multi-function printing device. The multi-function printing device has a scanner, a media path, a printer, a document feeder automatically feeding the sheets of media to the scanner, etc. The scanner scans a plurality of sheets of media to produce scanned images. Before scanning, the sheets of media have some form of markings already printed thereon. The computerized device automatically stores the scanned images, and the media path automatically feeds the sheets of media from the scanner to the printer after the scanner scans the sheets of media.

A meta-data generator is operatively connected to the multi-function printing device, and the meta-data generator automatically generates unique identification markings. The printer automatically prints such unique identification markings on the sheets of media after the scanner scans the sheets of media, such that each of the sheets of media has a different identification marking printed thereon by the printer. The unique identification markings can be human-readable markings or machine-readable markings.

The meta-data generator also generates data representing each of the unique identification marking, and the computerized device automatically adds such data representing each unique identification marking to each corresponding scanned image stored within the computerized device. When error images (e.g., ones of the sheets of media that were not scanned properly by the scanner) are identified, the computerized device automatically outputs the data representing each unique identification marking for each of the error images, allowing a user to locate the sheet of media associated with the error image, to permit the improperly scanned sheets to be rescanned. In some cases, the computer can scan the images, automatically select ones that are bad, and automatically send email to a medical records clerk to search for the record. Embodiments herein can also automatically find original scanned documents. With a machine readable mark, the computer can find the paper that was scanned improperly by searching for the correct mark, if the marking is machine-readable.

An exemplary method herein scans a plurality of sheets of media using the scanner of the multi-function printing device to produce scanned images. The method can automatically feed the sheets of media to the scanner using a document feeder of the multi-function printing device.

Further, this method automatically stores the scanned images within a computer storage device that is operatively connected to the multi-function printing device. The method also automatically generates the unique identification markings and the data representing each unique identification marking using the meta-data generator, and automatically adds the data representing each unique identification marking to each corresponding scanned image stored within the computer storage device.

After performing the scanning, this method can automatically feed the sheets of media from the scanner to the printer of the multi-function printing device using the media path of the multi-function printing device. Some embodiments herein can have an entirely different paper path for adding the marks since they might be small requiring much less than the full scan printer. For example, a simple serial number stamp can be enough.

Then, after moving the sheets of media, the method automatically prints unique identification markings on the sheets of media using the printer. After printing, each of the sheets of media has a different identification marking printed thereon by the printer. After performing the scanning process, the method identifies the error images of sheets that were not scanned properly, (which could be manual or automatic) and automatically outputs, from the computer storage device, the data representing each unique identification marking for each of the error images.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
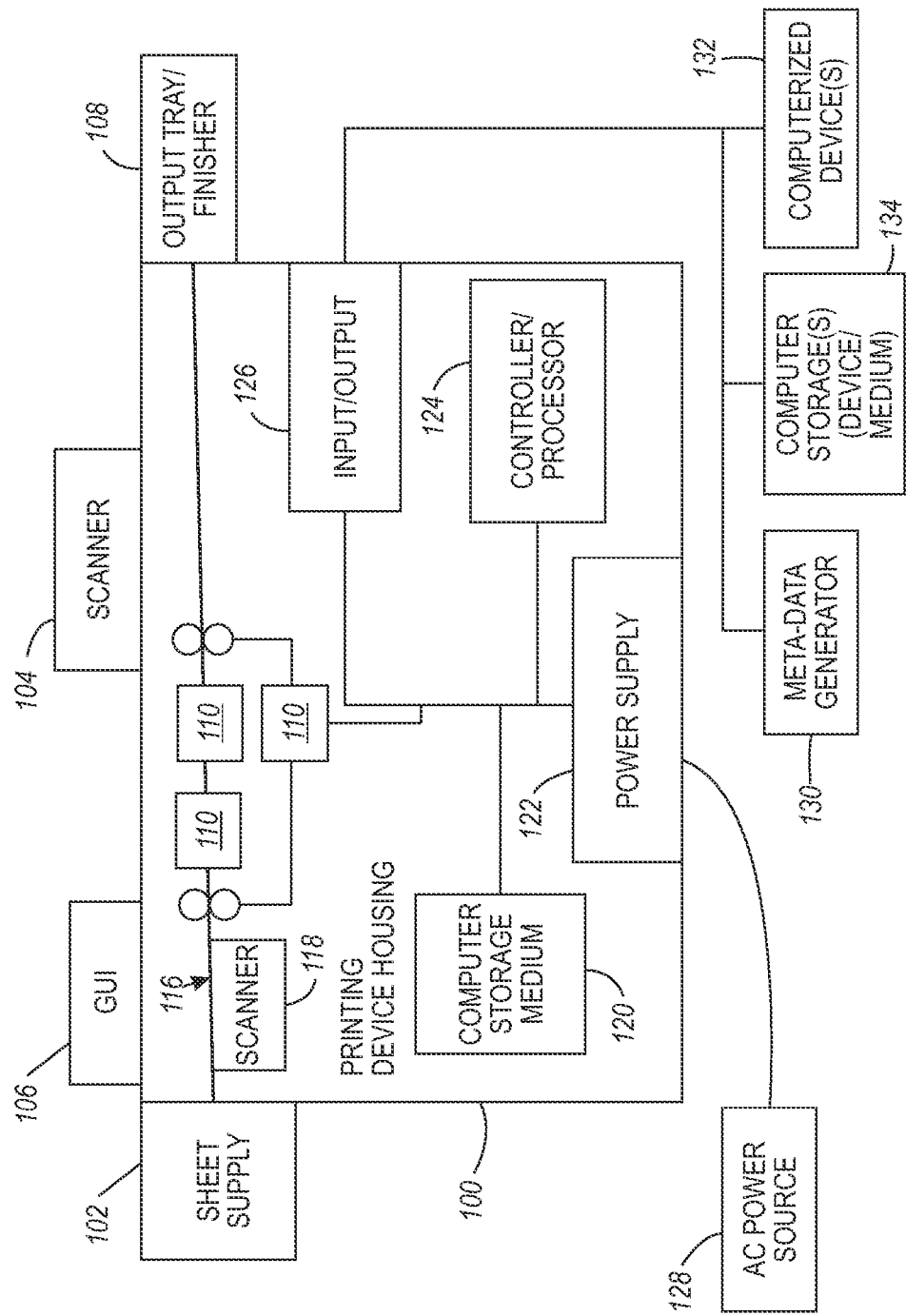
FIG. 1 is a schematic diagram of a system according to embodiments herein.

As mentioned above, when documents are scanned, they must be reviewed before the paper document (that was scanned) can be discarded. Current approaches provide either a print of the scan for review or display of the scan on a potentially small user interface on the multi-function printer. Also, these systems require the person who scanned the document to review the scan. Some systems do not require the person who scanned the document to review the scan, and instead send the scan to a remote reviewer; but if the scan is poor, finding the right document to be rescanned (which is stored at the scanning location) can be difficult.

With the embodiments herein, the multi-function printer automatically prints unique identification markings (sometimes referred to herein as "indicia") on the sheets of media immediately after the scanner scans the sheets of media. Using the invention described here, a doctor can scan the paper on a local multi-function printer (skip the process of reviewing the scanned image) and directly route the image to the patient's EMR. In addition, a pointer to the scanned image is routed to a department responsible for checking the scan. The paper original is printed with indicia and stored in a hopper associated with the multi-function printer. Once all scans have been approved, the paper originals in the hopper can be destroyed; otherwise, the papers that need to be rescanned are easily located in the hopper because of the unique identification markings printed on the papers. The indicia can be human-readable markings (numbers, letters, etc.) or machine-readable markings (e.g., a bar code, glyph, etc.) for systems that automatically retrieve the paper copies from the hopper.

With embodiments herein, paper documents are entered into a scanner, where they are scanned, producing an image document. Meta-data is generated for the image/paper document pair in a meta-data generator and is printed on the scanned document. The meta-data generator can be a user interface at which the user enters information on the images, it can be a sequence number generator, or it can be part of a more complex routing system that indicates where the image document goes and other data. The meta-data generator can also use information from the scanned document. The meta-data is stored with the scanned image and printed on the paper document.

For example, the meta-data generator could include the patient number and a sequence number. A digital representation of these two numbers can be stored with the image document and a bar code and/or human-readable markings representing the numbers could also be printed on the document.

As mentioned above, the printer prints the meta-data on the paper document. If there is a location on the paper where there are no markings, such as a margin, the meta-data will be printed there. If there is no area on which the meta-data could be printed without obscuring data on the original paper document, the information can be printed using less visible ink such as ultra-violet ink or yellow ink.

The hopper contains paper documents that have been scanned. The documents could be arranged in the hopper to make them easier to find. For example, the paper documents could be arranged in sequential order. Alternatively, they could be grouped by slip sheets. For example, if a group of documents is scanned for a single patient, a slip sheet could be used to separate documents by patient.

FIG. 1 illustrates a computerized printing device 100, according to embodiments herein and can comprise, for example, a printer, copier, multi-function machine, etc. The printing device 100 includes a controller/processor 124, at least one marking device (commonly referred to as printers or printing engines) 110 operatively connected to the processor 124, a media path 116 positioned to supply sheets of media from a sheet supply 102 to the marking device(s) 110, and a communications port (input/output) 126 operatively connected to the processor 124 and to a computerized network external to the printing device.

An output tray/finisher (sometimes referred to herein as a "hopper") 108 can simply receive the printed sheets, or can fold, staple, sort, etc., the various printed sheets. Also, the printing device 100 can include at least one accessory functional component (such as a scanner/document handler 104, graphic user interface assembly 106, etc.

The processor 124 controls the various actions of the printing device. A non-transitory computer storage medium device 120 (which can be optical, magnetic, capacitor based, etc.) is readable by the processor 124 and stores instructions that the processor 124 executes to allow the multi-function printing device to perform its various functions, such as those described herein. The input/output device 126 is used for communications to and from external devices connected by way of a network (wide area network, local area network, etc.). Such external devices can include, for example, one or more meta-data generators 130, external computer storages (device/medium) 134, and external computerized devices 132.

Pre-printed documents that are to be scanned can be loaded in the document handler 104, or can be loaded in the sheet supply 102. If loaded in the sheet supply 102, the documents to be scanned are fed along the media path 116 to an internal scanner 118, which scans the plurality of sheets of media to produce scanned images. Before scanning, the sheets of media generally have some form of markings already. There is nothing keeping one from scanning blank pages. However, there is usually no reason why one would want to. The computerized device 132 automatically stores the scanned images, and the media path 116 can automatically feed the sheets of media from the internal scanner 118 to the printing engines 110 after the internal scanner 118 scans the sheets of media (or this process can be manually performed). The same device that performed the scanning can also print the identification markings, or a different printer can be used to print the identification markings.

A meta-data generator 130 is operatively connected to the multi-function printing device, and the meta-data generator 130 automatically generates unique identification markings. The printing engines 110 automatically prints such unique identification markings on the sheets of media after the internal scanner 118 scans the sheets of media, such that each of the sheets of media has a different identification marking printed thereon by the printing engines 110. The unique identification markings can be human-readable markings, such as numbers, alphabetic characters, etc., or machine readable barcodes, glyphs, etc.

The meta-data generator 130 also automatically generates data representing each of the unique identification markings, and the computerized device 132 automatically adds such data representing each unique identification marking to each corresponding scanned image stored within the computerized device 132.

When error images (e.g., ones of the sheets of media that were not scanned properly by the internal scanner 118) are identified, the computerized device 132 can automatically output the data representing each unique identification marking for each of the error images, allowing a user to locate the sheet of media associated with the error image, to permit the improperly scanned sheets to be rescanned. Alternatively, a user (scan reviewer) can identify error images and note the unique marking of the error image to let the scan operator know which sheets need to be rescanned.

An output tray/finisher 108 can simply receive the printed sheets, or can fold, staple, sort, etc., the various printed sheets. Also, the printing device 100 can include at least one accessory functional component (such as an internal scanner 118/document handler 104, graphic user interface assembly 106, etc.

Thus, a printing engine body housing 100 has one or more functional components that operate on power supplied from the alternating current (AC) 128 by the power supply 122. The power supply 122 connects to an external alternating current power source 128 and converts the external power into the type of power needed by the various components.

As would be understood by those ordinarily skilled in the art, the printing device 100 shown in FIG. 1 is only one example and the embodiments herein are equally applicable to other types of printing devices that may include fewer components or more components. For example, while a limited number of printing engines, paper paths are illustrated in FIG. 1, those ordinarily skilled in the art would understand that many more paper paths, processors, databases, etc., and additional printing engines could be included within any printing device used with embodiments herein.

Figure 2:
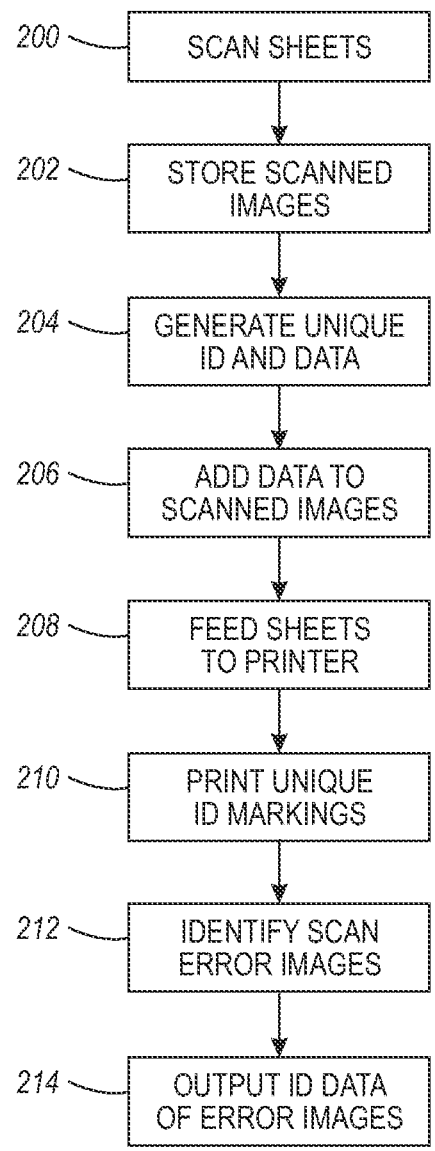
FIG. 2 is a flow diagram illustrating method embodiments herein.

FIG. 2 is flowchart illustrating an exemplary method herein. In item 200, this method scans a plurality of sheets of media using the scanner of the multi-function printing device to produce scanned images. The method can automatically feed the sheets of media to the scanner using a document feeder of the multi-function printing device.

Further, in item 202, this method automatically stores the scanned images within a computer storage device that is operatively connected to the multi-function printing device. The method also automatically generates the unique identification markings and the data representing each unique identification marking using the meta-data generator in item 204, and automatically adds the data representing each unique identification marking to each corresponding scanned image stored within the computer storage device in item 206.

After performing the scanning, this method automatically feeds the sheets of media from the scanner to the printer of the multi-function printing device using the media path of the multi-function printing device in item 208. Then, after moving the sheets of media, the method automatically prints unique identification markings on the sheets of media using the printer in item 210. After printing, each of the sheets of media has a different identification marking printed thereon by the printer.

After performing the scanning process, the method identifies the error images of sheets that were not scanned properly in item 212, and automatically outputs, from the computer storage device, the data representing each unique identification marking for each of the error images in item 214.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:

scanning a plurality of sheets of media using a scanner of a multi-function printing device to produce scanned images;

automatically storing said scanned images within a computer storage device that is operatively connected to said multi-function printing device;

after said scanning, automatically printing unique identification markings on said sheets of media using a printer of said multi-function printing device, such that each of said sheets of media has a different identification marking printed thereon by said printer;

after said printing, storing said sheets in a storage location;

automatically adding data representing each said unique identification marking to each corresponding scanned image stored within said computer storage device;

after said scanning, identifying error images of ones of said sheets of media that were not scanned properly during said scanning;
automatically outputting, from said computer storage device, said data representing each said unique identification marking for each of said error images;
locating said ones of said sheets of media that were not scanned properly at said storage location using said unique identification markings; and
rescanning said sheets of media that were not scanned properly.

2. The method according to claim 1, said unique identification markings comprising human-readable markings.

3. The method according to claim 1, further comprising automatically generating said unique identification markings and said data representing each said unique identification marking using a meta-data generator operatively connected to said multi-function printing device.

4. The method according to claim 1 further comprising automatically feeding said sheets of media to said scanner using a document feeder of said multi-function printing device.

5. The method according to claim 1, before said scanning, said sheets of media having markings thereon.

6. A method comprising:
scanning a plurality of sheets of media using a scanner of a multi-function printing device to produce scanned images;
automatically storing said scanned images within a computer storage device that is operatively connected to said multi-function printing device;
after said scanning automatically feeding said sheets of media from said scanner to a printer of said multi-function printing device using a media path of said multi-function printing device;
after said feeding of said sheets of media, automatically printing unique identification markings on said sheets of media using said printer, such that each of said sheets of media has a different identification marking printed thereon by said printer;
after said printing, storing said sheets in a storage location;
automatically adding data representing each said unique identification marking to each corresponding scanned image stored within said computer storage device;
after said scanning, identifying error images of ones of said sheets of media that were not scanned properly during said scanning;
automatically outputting, from said computer storage device, said data representing each said unique identification marking for each of said error images;
locating said ones of said sheets of media that were not scanned properly at said storage location using said unique identification markings; and
rescanning said sheets of media that were not scanned properly.

7. The method according to claim 6, said unique identification markings comprising human-readable markings.

8. The method according to claim 6, further comprising automatically generating said unique identification markings and said data representing each said unique identification marking using a meta-data generator operatively connected to said multi-function printing device.

9. The method according to claim 6 further comprising automatically feeding said sheets of media to said scanner using a document feeder of said multi-function printing device.

10. The method according to claim 6, before said scanning, said sheets of media having markings thereon.

11. A system comprising:
a multi-function printing device comprising a scanner and a printer, said scanner scanning a plurality of sheets of media to produce scanned images; and
a computerized device operatively connected to said multi-function printing device,
said computerized device automatically storing said scanned images after said scanner scans said sheets of media,
said printer automatically printing unique identification markings on said sheets of media after said scanner scans said sheets of media, such that each of said sheets of media has a different identification marking printed thereon by said printer,
after said printing, said sheets being stored in a storage location,
said computerized device automatically adding data representing each said unique identification marking to each corresponding scanned image stored within said computerized device,
when error images are identified, said computerized device automatically outputs said data representing each said unique identification marking for each of said error images,
said error images comprising of ones of said sheets of media that were not scanned properly by said scanner,
said ones of said sheets of media that were not scanned properly being located at said storage location using said unique identification markings, and
said sheets of media that were not scanned properly being rescanned.

12. The system according to claim 11, said unique identification markings comprising human-readable markings.

13. The system according to claim 11, further comprising a meta-data generator operatively connected to said multi-function printing device, said meta-data generator automatically generating said unique identification markings and said data representing each said unique identification marking.

14. The system according to claim 11, said multi-function printing device further comprising a document feeder automatically feeding said sheets of media to said scanner.

15. The system according to claim 11, before said scanning, said sheets of media having markings thereon.

16. A system comprising:
a multi-function printing device comprising a scanner, a media path, and a printer, said scanner scanning a plurality of sheets of media to produce scanned images; and
a computerized device operatively connected to said multi-function printing device,
said computerized device automatically storing said scanned images after said scanner scans said sheets of media,
said media path automatically feeding said sheets of media from said scanner to said printer after said scanner scans said sheets of media,
said printer automatically printing unique identification markings on said sheets of media after said scanner scans said sheets of media, such that each of said sheets of media has a different identification marking printed thereon by said printer,
after said printing, said sheets being stored in a storage location, said computerized device automatically adding data representing each said unique identification marking to each corresponding scanned image stored within said computerized device, when error images are identified, said computerized device automatically outputs said data representing each said unique identification marking for each of said error images, said error images comprising of ones of said sheets of media that were not scanned properly by said scanner, said ones of said sheets of media that were not scanned properly being located at said storage location using said unique identification markings, and said sheets of media that were not scanned properly being rescanned.

17. The system according to claim 16, said unique identification markings comprising human-readable markings.

18. The system according to claim 16, further comprising a meta-data generator operatively connected to said multi-function printing device, said meta-data generator automatically generating said unique identification markings and said data representing each said unique identification marking.

19. The system according to claim 16, said multi-function printing device further comprising a document feeder automatically feeding said sheets of media to said scanner.

20. The system according to claim 16, before said scanning, said sheets of media having markings thereon.

* * * * *